United States Patent

[11] 3,573,655

[72] Inventor Billie J. Graham
  Lothian, Md. 20820
[21] Appl. No. 748,872
[22] Filed July 30, 1968
[45] Patented Apr. 6, 1971

[54] COMBUSTION LASER
  10 Claims, 1 Drawing Fig.
[52] U.S. Cl.................................................. 331/94.5,
  330/4.3
[51] Int. Cl...................................................... H01s 3/00
[50] Field of Search.......................................... 331/94.5;
  330/4.3

Primary Examiner—Richard A. Farley
Assistant Examiner—Joseph G. Baxter
Attorneys—L. A. Miller, Q. E. Hodges, A. Sopp and R. F. Rotella ABSTRACT: A molecular gas combustion laser includes a sealed metal tube having reflecting mirrors at each end thereof. A suitable mixture of gases is introduced under pressure into the tube chamber and ignited by an electrical sparking device thereby producing lasing action. The laser output is taken from a small orifice provided in one of the reflecting mirrors. System cooling is achieved by means of a water jacket surrounding the metal tube.

Patented April 6, 1971
3,573,655
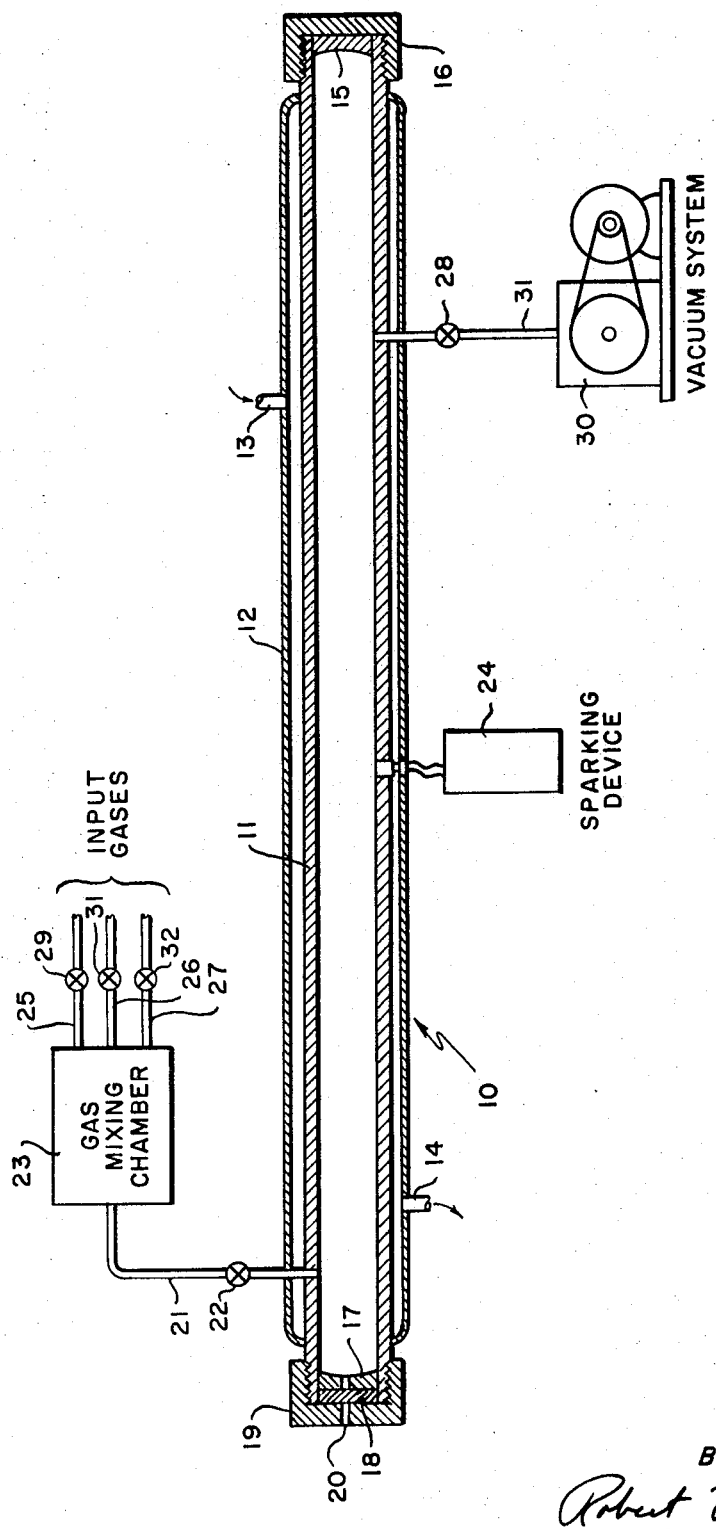
INVENTOR
B. J. GRAHAM
BY
ATTORNEYS

COMBUSTION LASER

The invention described herein may be manufactured and used by or for the Government of the United States of America for governmental purposes without the payment of any royalties thereon or therefor.

BACKGROUND OF THE INVENTION

This invention relates to lasers and more particularly to gas combustion lasers.

Gas lasers generally comprise a container, made of glass or crystal, into which is introduced one or more types of gases at pressures of about 5 mm. of mercury. These gases are then pumped or excited by an electrical source which may be either AC, DC, pulsating DC, radio frequency, heating, or some combination of these. The container is provided with reflecting surfaces which, along with the cavity, contain the lasing activity; a suitable output for the light output also being provided.

Gas lasers which are presently in use suffer from a number of disadvantages among which are the following: They are quite fragile since they are made largely of glass and crystal components. The sources of electrical power required for pumping are often complex, bulky, and expensive. The majority of gas lasers are restricted to the use of a given gas or a particular combination of gases.

The source of laser radiation arises from the excitation of the vibration-rotation energy levels of the gas molecules. In general, the resulting effect is a population inversion from the ground state to an upper energy level having a relatively long lifetime effected by mechanical collisions between the molecules and other types of energy transfer. In the case of carbon dioxide ($CO_2$) lasers, nitrogen and helium are introduced along with $CO_2$ as agents for transferring energy by increasing the number of mechanical collisions.

These excitations can also be caused by an explosive type excitation. The pressures within a gas laser tube are of the order of 5 mm. of Hg. The reason for this small pressure is to keep the mean free path between ions large enough for them to build up enough kinetic energy to cause excitation upon mechanical collision with other molecules. Explosions can be used to cause molecular vibration-rotation excitation in many gases.

Some gases will be better suited for this type of excitation than others. An explosion producing $CO_2$ as a byproduct could have the disadvantage of leaving hydrocarbon residues which may cover and thus ruin the optics of the laser system. A solution to this would be to produce an explosion which was not chemically reactive to $CO_2$ but which excited the $CO_2$ molecule by mechanical motion only. An explosion of hydrogen and chlorine produces hydrochloric acid which is highly active and would quickly ruin the optics of a laser. A good combination to use is hydrogen and oxygen which produces a somewhat controllable chainlike reaction explosion. This allows some of the newly formed molecules to be excited by the explosion of others.

Accordingly, it is an object of the present invention to provide an improved gas combustion laser which may be made almost entirely of metal and is therefore quite rugged.

Another object of the present invention is to provide a gas laser which requires only a simple source of electrical pumping energy.

A further object of the present invention is to provide a gas combustion laser which is capable of operation with a wide variety of working gases.

SUMMARY OF THE INVENTION

The above objects are achieved by providing a molecular gas combustion laser comprising a sealed metal tube having reflecting mirrors at each end thereof into which a suitable mixture of gases under pressure is introduced and ignited by a relatively simple electrical sparking device. The output of the laser is taken from a small orifice provided in one of the reflecting mirrors. The entire system may be cooled by a water jacket assembly surrounding a metal tube.

The above objects and operation of this invention may be further understood by reference to the following detailed description taken in conjunction with the accompanying drawing in which:

The sole FIG. is a sectional view of the gas combustion laser in accordance with the invention.

Referring now to the drawing, the gas combustion laser 10 includes an elongated metal tube 11 which is preferably cylindrical in shape and hollow, thereby defining a cavity therein; and which may be fabricated, in the preferred embodiment, of stainless steel. The interior surfaces of tube 11 are highly polished and plated to give high reflectance at the infrared wavelengths at which the present laser operates. Stainless steel provides the structural strength necessary to withstand the repeated explosions caused by the lasing action.

Concentrically disposed about tube 11 is a water jacket 12 which permits the flow of fluid material about the external periphery of tube 11. Water jacket 12 may be appropriately sealed at its juncture with tube 11 at the axial extremities thereof by means of suitable gaskets (not shown) to confine the flow of fluid. An inlet tube 13 and an outlet tube 14 are provided for connection with suitable circulatory apparatus (not shown). In general, the fluid introduced into the water jacket assembly will be for the purpose of cooling tube 11 which is heated as a result of the lasing action. For this purpose, any conventional coolant, such as water, may be utilized. On the other hand, it may be necessary to heat tube 11 and the gases contained therein in order to achieve a rise in the energy level of said gases so that lasing action may be readily achieved. For this purpose, therefore, any suitable heated fluid may be utilized.

Each end of tube 11 is provided with reflecting surfaces or mirrors 15 and 17. In the preferred embodiment mirrors 15, 17 may be fabricated of highly polished stainless steel. Again, stainless steel is chosen to provide the structural stability necessary to withstand the explosions caused by the lasing action as well as providing optimum reflectivity at infrared wavelengths. The mirrors may be polished to within 1/10 of a wavelength at the infrared region for this purpose. For optimum reflectivity mirrors 15 and 17 may be coated with aluminum or gold.

For ease of obtaining and maintaining alignment, mirrors 15 and 17 may have a spherical cross-sectional configuration with the respective concave surfaces facing the interior cavity, having a radius of curvature at least as long as the length of tube 11. However, other mirror designs and configurations may be desirable in particular instances as will be apparent to those skilled in the art.

The diameter of tube 11 is not as critical with regard to the laser power output as the tube length. However, the tube diameter should be designed as small as possible. This permits the mirrors 15 and 17 to have a correspondingly small diameter thereby giving them added strength to withstand the explosions within the tube and also prevent misalignment.

The laser output is taken through a small orifice provided through the center of mirror 17. This orifice 20 must be optimized like the diameters of tube 11 and mirrors 15 and 17. Orifice 20 must be as small as possible and yet large enough to give a good power output. For example, orifices which are used in carbon dioxide lasers operating in the 10.6 micron range run from 0.25 mm. to 6 or 7 mm. in diameter.

Tube 11 is sealed at one end thereof by means of a suitable cap 16 which may be threaded into place. The output end is sealed by means of a cap 19 similarly threaded into place through which orifice 20 is provided.

In order to contain the gas within tube 11, a flat backing plate 18 of material transparent to infrared radiation, such as germanium or Irtran, is inserted between cap 19 and the rear of output mirror 17.

Connected to the interior cavity of tube 11 is a vacuum system 30 which may comprise a conventional vacuum pump connected by means of pipe 31 through adjustable valve 28. If used in certain environments, such as outer space, the mechanical vacuum system may be dispensed with in favor of the natural vacuum of that region. In the preferred embodiment, tube 11 is evacuated to a pressure of approximately 20 microns. The respective input gases are fed through pipes 25, 26 and 27 to a gas mixing chamber 23. Leak valves 29, 31 and 32 are associated with pipes 25, 26 and 27 and allow the respective gases to be leaked into the gas mixing chamber 23 at the proper pressure.

Although, by way of example, the number of input gases is herein shown to be three, it is to be understood that any desired number of gas components may be advantageously used in this invention. Chamber 23 may be then sealed, following which, the resulting gas mixture may be fed into the cavity of laser tube 11 by means of connecting pipe 21 connected between mixing chamber 23 and the interior of tube 11. Valve 22 permits the gases to be leaked into the cavity at the desired rate. This system affords adequate protection against the high back pressures which are created during explosions within the cavity.

The gases may be exploded by means of an electrical sparking device 24 which is electrically connected by means of wires to the interior cavity of tube 11. The sparking device 24 may comprise any arrangement for creating an electrical spark such as a battery, capacitor discharge circuit, or a spark plug.

The lasing action which takes place in the present invention is of the pulsed type. Accordingly, both the input gas supply and the gas exhausted through the vacuum system 30 can be synchronized as, for example, in the same manner as an internal combustion engine. Even the gas byproducts of engines or other energy systems could be incorporated into this cyclic action. The fuel cells similar to those used on spacecraft are a good example of this. They use both hydrogen and oxygen which could be made a part of the combustion lasing system also. With this arrangement, the laser may be pulsed repetitively within a short time period to obtain an output similar to that generated by continuous-wave (CW) lasers.

It may be seen from the foregoing description that the present invention provides a gas combustion laser system which is rugged, since it may be constructed almost entirely of metal, highly portable and entirely self-contained, and which requires only simple electrical apparatus for firing. Furthermore, the laser system is adaptable to the use of a variety of working gas combinations.

It is feasible that the laser produce radiation characteristics of a given gas at a given time; of different gases at different times; or of several gases simultaneously by appropriately synchronizing the operations of the input gas flow, exhaust gas flow and electrical sparking device.

Since the invention does not require for its output the use of Brewster windows, which are necessarily cut for a particular wavelength or partially reflecting dielectric mirrors also designed for a particular wavelength, the design is suitable for the employment of any gas or gases capable of providing lasing action in the infrared range.

Having described the invention, it will be apparent that many modifications will be obvious to one skilled in the art and, consequently, the scope of the invention is to be measured solely by the following claims.

I claim:
1. A gas laser system comprising:
   an elongated metal container having a cavity therein for containing gaseous material;
   reflecting surfaces at each end of said container;
   one of said reflecting surfaces being provided with an aperture for the transmission of light radiation therethrough;
   a gas supply connected to said cavity for supplying said gaseous material;
   a vacuum system connected to said cavity for reducing the pressure in said cavity; and
   an electrical sparking circuit connected to said cavity for causing said gaseous material to ignite.
2. A gas laser system as set forth in claim 1 wherein:
   the interior cavity-defining walls of said container are provided with reflecting surfaces.
3. A gas laser system as set forth in claim 2 wherein:
   said reflecting surfaces at each end of said container comprise metal mirrors.
4. A gas laser system as set forth in claim 3 wherein:
   said mirrors have a spherical cross section; and
   said mirrors being aligned along the axis of said container.
5. A gas laser system as set forth in claim 4 wherein:
   said mirrors have a radius of curvature at least as long as the length of said container; and
   the concave surfaces of said mirrors being oriented towards each other.
6. A gas laser system as set forth in claim 5 wherein:
   said gas supply comprises a chamber for mixing a plurality of gases capable of supporting laser activity; and
   a supply tube system for introducing said mixture of gases into said container at a particular pressure.
7. A gas laser system as set forth in claim 6 wherein:
   said gases are capable of supporting laser activity in the infrared wavelength region.
8. A gas laser system as set forth in claim 7 further comprising:
   a fluid temperature control assembly disposed about the extremity of said container.
9. A gas laser system as set forth in claim 8 wherein:
   said temperature control assembly heats the mixture of gases contained within said container thereby raising the energy level of said gases.
10. A gas laser system as set forth in claim 9 wherein:
    said electrical sparking circuit ignites said gases cyclically; and
    said vacuum system exhausts the combustion products of said ignition.